United States Patent
Yamane et al.

(10) Patent No.: US 9,403,438 B2
(45) Date of Patent: Aug. 2, 2016

(54) CONTROL DEVICE FOR HYBRID VEHICLE AND CONTROL METHOD FOR HYBRID VEHICLE

(71) Applicant: Samsung SDI Co., Ltd., Yongin-si, Gyeonggi-do (KR)

(72) Inventors: Futoshi Yamane, Yokohama (JP); Masami Ishikawa, Yokohama (JP); Yoshinari Murayama, Yokohama (JP); Mitsutoshi Muraoka, Yokohama (JP); Taro Yoshida, Yokohama (JP); Kenji Furusawa, Yokohama (JP)

(73) Assignee: Samsung SDI Co., Ltd., Yongin-si (KR)

( * ) Notice: Subject to any disclaimer, the term of this patent is extended or adjusted under 35 U.S.C. 154(b) by 126 days.

(21) Appl. No.: 14/329,685

(22) Filed: Jul. 11, 2014

(65) Prior Publication Data

US 2015/0069935 A1 Mar. 12, 2015

(30) Foreign Application Priority Data

Sep. 6, 2013 (JP) .................................. 2013-184645
Feb. 12, 2014 (KR) ........................ 10-2014-0016244

(51) Int. Cl.
*B60W 20/00* (2016.01)
*B60L 11/02* (2006.01)
(Continued)

(52) U.S. Cl.
CPC . *B60L 11/02* (2013.01); *B60K 6/48* (2013.01); *B60K 6/485* (2013.01); *B60W 10/08* (2013.01); *B60W 20/00* (2013.01); *B60W 20/10* (2013.01); *B60W 2510/244* (2013.01); *B60W 2710/083* (2013.01); *B60Y 2300/525* (2013.01); *B60Y 2300/64* (2013.01); *Y02T 10/6226* (2013.01); *Y02T 10/70* (2013.01); *Y02T 10/7077* (2013.01)

(58) Field of Classification Search
CPC ..... B60W 10/08; B60W 10/06; B60W 20/00; B60W 20/108; B60W 2710/083; B60W 2710/0666; B60W 2710/081; B60W 2710/08; B60W 2510/081; B60W 2510/0638
USPC ........................................................ 318/139
See application file for complete search history.

(56) References Cited

U.S. PATENT DOCUMENTS 6,938,713 B1  9/2005 Tahara et al.
7,772,791 B2  8/2010 Lim et al.
(Continued)

FOREIGN PATENT DOCUMENTS

EP  1 832 466 A1  9/2007
JP  2013-049359  3/2013
(Continued)

OTHER PUBLICATIONS

EPO Search Report dated Feb. 20, 2015, for corresponding European Patent application 14183722.9, (5 pages).

*Primary Examiner* — Bentsu Ro
(74) *Attorney, Agent, or Firm* — Lewis Roca Rothgerber Christie LLP

(57) ABSTRACT

A control device for a hybrid vehicle includes: a current command value calculator configured to calculate torque and a weak field current command values input to the inverter; and a current command value correction calculator configured to calculate torque and weak field current correction values added to the torque and weak field current command values, wherein when an accumulation of electricity of the electricity storage device is equal to or larger than a reference value, the current command value calculator is configured to calculate the torque and weak field current command values to make a load applied to the engine by the motor generator zero, and the current command value correction calculator is configured to calculate the torque and weak field current correction values to make a load applied to the engine by the motor driving system other than the motor generator zero.

5 Claims, 3 Drawing Sheets

(51) Int. Cl.
  *B60K 6/48* (2007.10)
  *B60K 6/485* (2007.10)
  *B60W 10/08* (2006.01)

(56) References Cited

U.S. PATENT DOCUMENTS 7,975,791 B2 * 7/2011 Nozaki .................... B60K 6/48
                                                           180/65.21
8,903,585 B2 * 12/2014 Tanishima ............... B60K 6/48
                                                           180/65.265
9,205,833 B2 * 12/2015 Kawamura ............... B60K 6/48
2012/0139458 A1 6/2012 Yoo
2013/0116078 A1 5/2013 Hokoi

FOREIGN PATENT DOCUMENTS

| KR | 10-2004-0027940 A | 4/2004 |
| KR | 10-0957330 B1 | 5/2010 |
| KR | 10-2012-0063115 | 6/2012 |

\* cited by examiner

CONTROL DEVICE FOR HYBRID VEHICLE AND CONTROL METHOD FOR HYBRID VEHICLE

CROSS-REFERENCE TO RELATED APPLICATION

This application claims priority to and the benefit of Japanese Patent Application No. 2013-184645, filed in the Japanese Patent Office on Sep. 6, 2013, and Korean Patent Application No. 10-2014-0016244, filed in the Korean Intellectual Property Office on Feb. 12, 2014, the entire contents of which are incorporated herein by reference.

BACKGROUND

1. Field

Embodiments of the present invention relate to a control device for a hybrid vehicle and a control method for a hybrid vehicle.

2. Description of the Related Art

A hybrid vehicle includes an engine, a motor generator, an inverter for driving the motor generator, and an electricity storage device, which charges and discharges power to and from the motor generator via the inverter.

Here, as a type of hybrid vehicle, there is a direct coupling type which mechanically couples an engine to a motor driving system. The motor driving system is configured with the motor generator and a belt and a pulley which transfer a driving force of the motor generator to an engine driving shaft.

In the direct coupling type hybrid vehicle, which mechanically couples the engine to the motor driving system, a loss, such as an iron loss, occurs from the motor generator at the time of an engine driving mode using only the driving force of the engine, that is, a drag torque in a deceleration direction against an engine output occurs.

As such, there are methods of generating a torque for removing the drag torque of the motor generator and methods of controlling the drag torque of the motor generator to a zero torque so that the drag torque of the motor generator does not hinder the engine output.

However, even in the case of mechanical elements such as the belt or the pulley that are part of the motor driving system, a rolling resistance, that is, a mechanical output (e.g., load) in the deceleration direction against the engine output, occurs.

Therefore, even though a zero torque control is performed to remove the drag torque of the motor generator, the overall motor driving system generates an output in the deceleration direction against the engine output and therefore may apply a load to the engine.

SUMMARY

Embodiments of the present invention provide a control device for a hybrid vehicle and a control method for a hybrid vehicle which make a drag torque zero of a motor driving system configured with a motor generator and a mechanical element for directly coupling the motor generator to an engine at the time of an engine driving mode using only a driving force of the engine in the hybrid vehicle. Embodiments of the present invention also provide a control device for a hybrid vehicle and a control method for a hybrid vehicle that do not apply a load to the engine.

According to an example embodiment, there is provided a control device for a hybrid vehicle including an engine, a motor generator, an inverter configured to drive the motor generator, and an electricity storage device configured to charge and to discharge power to and from the motor generator through the inverter, to switch to a hybrid driving mode which controls driving using a driving force of the engine and the motor generator and to switch to an engine driving mode which controls driving using only the driving force of the engine, the control device for a hybrid vehicle including: a current command value calculator configured to calculate a torque current command value and a weak field current command value input to the inverter based on a torque command value representing a torque to be output by the motor generator, a revolutions per minute (RPM) of the motor generator, and an inverter input DC voltage value input to the inverter; and a current command value correction calculator configured to calculate a torque current correction value and a weak field current correction value added to the torque current command value and the weak field current command value, respectively, based on the RPM of the motor generator and the inverter input DC voltage value, wherein when an accumulation of electricity of the electricity storage device is equal to or larger than a reference value in the engine driving mode, the current command value calculator is configured to calculate the torque current command value and the weak field current command value to make a load applied to the engine by the motor generator zero, and the current command value correction calculator is configured to calculate the torque current correction value and the weak field current correction value to make a load applied to the engine by the motor driving system other than the motor generator zero.

The control device may further include: a current correction value data storage unit configured to store current correction value data representing a torque current correction value and a weak field current correction value previously measured for each RPM of the motor generator to make the load applied to the engine by the motor driving system other than the motor generator zero, wherein the current command value correction calculator is configured to calculate the torque current correction value and the weak field current correction value using the current correction value data stored in the current correction value data storage unit based on the RPM of the motor generator.

The current command value correction calculator may be configured to calculate the torque current correction value and the weak field current correction value when the accumulation of the electricity of the electricity storage device is at a full-charge state.

The current command value correction calculator may be configured to calculate the torque current correction value and the weak field current correction value when the accumulation of the electricity of the electricity storage device is at a full-charge state.

According to another embodiment of the present invention, there is provided a control program for a hybrid vehicle including an engine, a motor generator, and an inverter configured to drive the motor generator, and an electricity storage device configured to charge and to discharge power to and from the motor generator through the inverter, switch to a hybrid driving mode which controls driving using a driving force of the engine and the motor generator and to switch to an engine driving mode which controls driving using only the driving force of the engine, the control program for the hybrid vehicle allowing a computer to execute functions of: a current command value calculator configured to calculate a torque current command value and a weak field current command value input to the inverter based on a torque command value representing a torque to be output by the motor generator, a revolutions per minute (RPM) of the motor generator, and an inverter input DC voltage value input to the inverter; and a current command value correction calculator configured to calculate a torque current correction value and a weak field current correction value added to the torque current command value and the weak field current command value, respectively, based on the RPM of the motor generator and the inverter input DC voltage value, wherein when an accumulation of electricity of the electricity storage device is equal to or larger than a reference value in the engine driving mode, the current command value calculator is configured to calculate the torque current command value and the weak field current command value to make a load applied to the engine by the motor generator zero, and the current command value correction calculator is configured to calculate the torque current correction value and the weak field current correction value to make a load applied to the engine by the motor driving system other than the motor generator zero.

According to example embodiments of the present invention, the current command value arithmetic unit may calculate the torque current command value and the weak field current command value which make the load applied to the engine by the motor generator zero based on the RPM of the motor generator and the inverter input DC voltage value, and the current command value correction unit may calculate the torque current correction value and the weak field current correction value which make the loads applied to the engine by the motor driving system other than the motor generator zero to reduce (e.g., prevent) drag torques of the motor generator and the motor driving system and to reduce (e.g., prevent) generation of the load to the engine.

According to example embodiments of the present invention, since the torque current correction value and the weak field current correction value are each added to the torque current command value and the weak field current command value, the motor generator may be driven with an optimal current value and a reduction in efficiency of the motor generator may be suppressed as small as possible.

According to example embodiments of the present invention, since the torque current correction value and the weak field current correction value are calculated using the current correction value data previously measured for each RPM of the motor generator, the load applied to the engine by the motor driving system may be zero (e.g., precisely zero) and the control contents may be simplified.

According to example embodiments of the present invention, since the torque current command value and the weak field current command value are calculated using the correction data for command value calculation previously measured for each RPM of the motor generator, the load applied to the engine by the motor generator may be zero (e.g., precisely zero) and the control contents may be simplified.

According to example embodiments of the present invention, it is possible to reduce (e.g., prevent) the overcharge of the electricity storage device and the deterioration of the electricity storage device while charging the electricity storage device without excess and deficiency.

According to example embodiments of the present invention, it is possible to reduce (e.g., prevent) generation of the load to the engine by making the drag torque zero of the motor driving system configured with the motor generator and the mechanical element for directly coupling the motor generator to the engine at the time of the engine driving mode using only the driving force of the engine in the hybrid vehicle.

DETAILED DESCRIPTION

Figure 1:
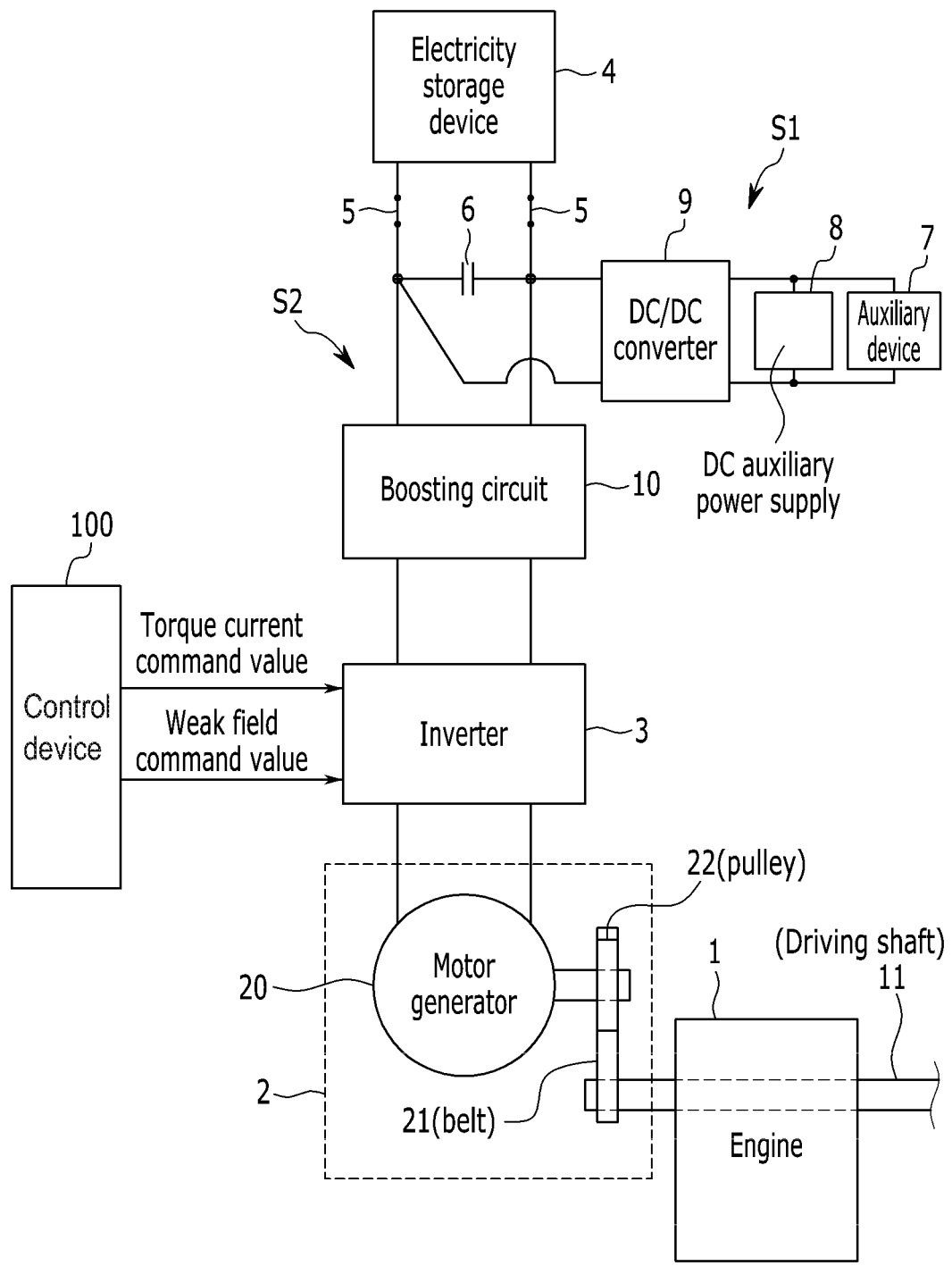
FIG. 1 is a schematic diagram illustrating a configuration of a hybrid vehicle according to an example embodiment of the present invention.

In the following detailed description, only certain example embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, a control device for a hybrid vehicle according to an example embodiment will be described with reference to the accompanying drawings.

FIG. 1 is a schematic diagram illustrating a configuration of a hybrid vehicle according to an example embodiment of the present invention.

Referring to FIG. 1, a control device 100 for a hybrid vehicle according to an example embodiment is included in a hybrid vehicle which further includes an engine 1, a motor driving system 2 including a motor generator 20, an inverter 3 for driving the motor generator 20, an electricity storage device 4 for charging and discharging power to and from the motor generator 20 via the inverter 3, an auxiliary equipment power system S1 for supplying power to each auxiliary device 7 and a DC auxiliary power supply 8 of the vehicle, and a motor power system S2 for performing retrogression driving or regeneration driving of the motor generator 20.

The auxiliary equipment power system S1 is a system which includes the electricity storage device 4 (for example, a lithium ion battery of 48V) which is a DC main power supply, switches (e.g., DC contactors) 5, each coupled to both of the output terminals of the electricity storage device 4 to open and close an electric circuit, a smoothing condenser (e.g., a smoothing capacitor or a DC link condenser) 6 between the respective switches 5 and coupled to each auxiliary device (for example, an electric power steering motor, an air conditioner, an ECU, and the like) 7 and a DC auxiliary power supply (for example, 12V/24V battery) 8 of the vehicle coupled through the smoothing condenser 6 to supply power.

Further, the auxiliary equipment power system S1 further includes a DC/DC converter 9, and both output terminals of the DC/DC converter 9 are coupled to each of the auxiliary devices 7 and the DC auxiliary power supply 8 of the vehicle in parallel.

The motor power system S2 is coupled to the auxiliary equipment power system S1 in parallel through the smoothing condenser 6, and includes a boosting circuit 10 for performing a voltage conversion of a DC voltage from the electricity storage device 4 and the inverter 3, for converting the DC voltage output from the boosting circuit 10 to an AC voltage and outputting the AC voltage to the motor generator 20.

Here, the hybrid vehicle according to the example embodiment applies a parallel type in which power from the engine 1 and the motor generator 20 is used to drive a wheel in parallel. For example, as illustrated in FIG. 1, the parallel type hybrid vehicle according to the example embodiment includes a driving shaft 11 of the engine 1, the motor generator 20, and the motor driving system 2. The motor driving system 2 is configured with a belt 21, a pulley 22, and the like directly coupled to the engine 1. The parallel type hybrid vehicle has a structure which may not be separated without the installation of the clutch, and the like, that is, a structure in which the engine 1 is mechanically coupled to the motor generator 20 at all times.

Further, the control device 100 for a hybrid vehicle, which controls the hybrid vehicle, may switch to an engine driving mode M1 which controls driving using only a driving force of the engine 1, or to a hybrid driving mode M2 which controls driving using a driving force of the motor generator 20, in addition to the driving force of the engine 1.

Figure 2:
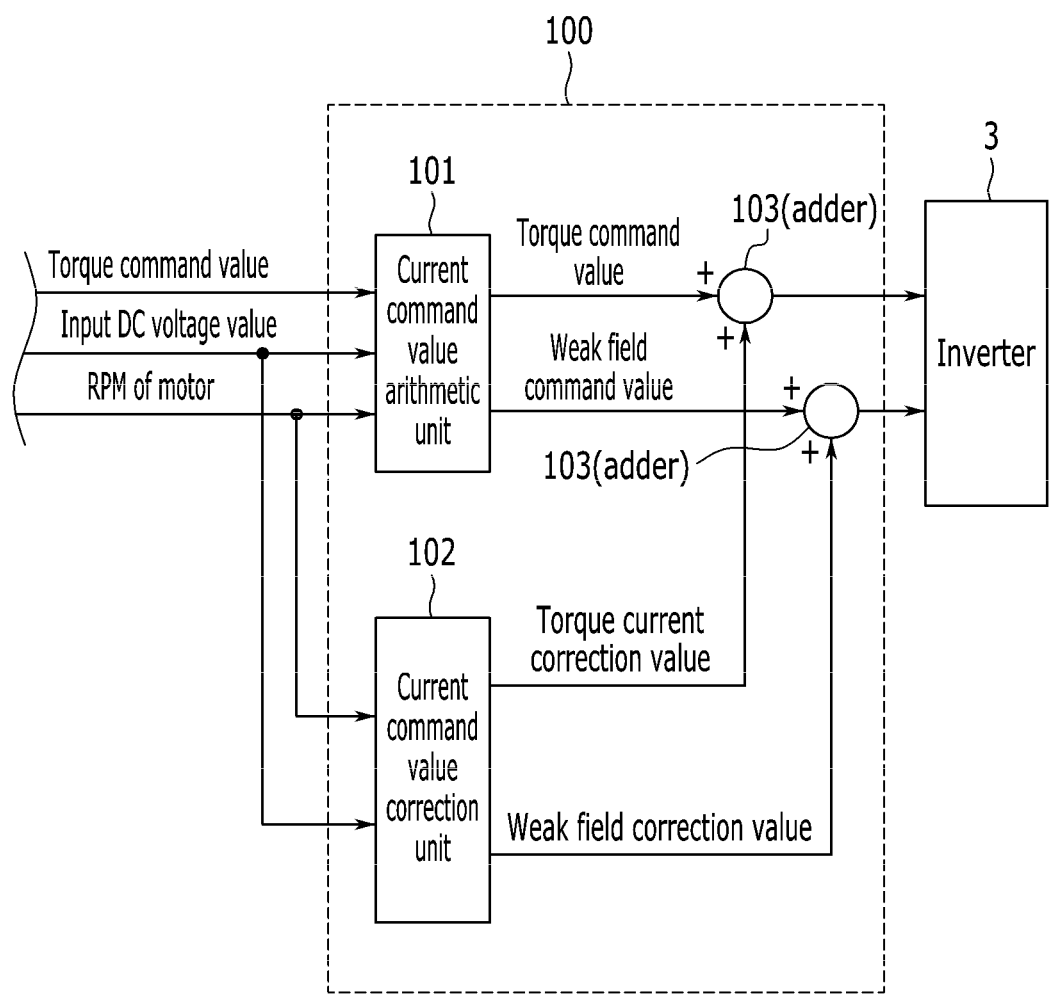
FIG. 2 is a diagram illustrating a circuit configuration of a control device for a hybrid vehicle according to an example embodiment of the present invention.

FIG. 2 is a diagram illustrating a circuit configuration of a control device for a hybrid vehicle according to an example embodiment of the present invention.

For example, as illustrated in FIG. 2, the control device 100 for a hybrid vehicle includes a current command value arithmetic unit (e.g., a current command value calculator) 101 for calculating (or operating) a torque current command value Cq and a weak field current command value Cd which are input to the inverter 3, a current command value correction unit (e.g., a current command value correction calculator) 102 for calculating (or operating) a torque current correction value Rq and a weak field current correction value Rd which are added to the torque current command value Cq and the weak field current command value Cd, respectively, when an accumulation of electricity of the electricity storage device 4 is equal to or larger than a reference value (e.g., a predetermined value), and an adder 103 for adding the torque current correction value Rq and the weak field current correction value Rd to the torque current command value Cq and the weak field current command value Cd, respectively.

The current command value arithmetic unit 101 generates a value that represents a torque to be output by the motor generator 20 and calculates the torque current command value Cq and the weak field current command value Cd based on a torque command value which is input from an engine control unit (ECU), revolutions per minute (RPM) of the motor generator 20, and an inverter input DC voltage value which is a DC voltage value input to the inverter 3.

For example, the current command value arithmetic unit 101 calculates the torque current command value Cq and the weak field current command value Cd so that the motor generator 20 generates a torque having a set size (e.g., a predetermined size) depending on a driving mode which is selected from the engine driving mode M1 and the hybrid driving mode M2 in the hybrid vehicle.

Furthermore, when the hybrid vehicle is driven in the engine driving mode M1, the current command value arithmetic unit 101 calculates the torque current command value Cq and the weak field current command value Cd so that the motor generator 20 performs the regeneration driving when the accumulation of electricity of the electricity storage device 4 is equal to or smaller than the reference value (e.g., the predetermined value).

Further, when the accumulation of electricity of the electricity storage device 4 is equal to or larger than the reference value (e.g., the predetermined value), for example, when the accumulation of electricity of the electricity storage device 4 is in a full-charge state, the torque current command value Cq and the weak field current command value Cd are calculated so that the drag torque of the motor generator 20, that is, a load applied to the engine 1 by the motor generator 20, is 0.

Further, when the hybrid vehicle is driven in the hybrid driving mode M2, the current command value arithmetic unit 101 calculates the torque current command value Cq and the weak field current command value Cd for generating the torque having the set size (e.g., the predetermined size) so that the motor generator 20 supplements the engine 1 (e.g., retrogression driving).

Here, when the current command value arithmetic unit 101 is driven in the engine driving mode M1, in the case in which the accumulation of electricity of the electricity storage device 4 is equal to or larger than the reference value (e.g., the predetermined value), for example, in the case in which the accumulation of electricity of the electricity storage device 4 is in the full-charge state, the torque current command value Cq and the weak field current command value Cd are calculated based on correction data for command value calculation.

For example, the correction data for command value calculation are data which represent the command value which is added to the torque current command value Cq and the weak field current command value Cd so that the drag torque occurring by the motor generator 20, that is, the load applied to the engine 1 by the motor generator 20, becomes zero.

When the current command value correction unit 102 is driven in the engine driving mode M1, in the case in which the accumulation of electricity of the electricity storage device 4 is equal to or larger than the reference value (e.g., the predetermined value), for example, in the case in which the accumulation of electricity of the electricity storage device 4 is in the full-charge state, the torque current correction value Rq and the weak field current correction value Rd, which are added to the torque current command value Cq and the weak field current command value Cd, are calculated using the current correction value data which represent the torque current correction value Rq and the weak field current correction value Rd.

Further, as illustrated in FIG. 2, the torque current correction value Rq and the weak field current correction value Rd, which are calculated by the current command value correction unit 102, are input to the adder 103, and the adder 103 adds the torque current correction value Rq and the weak field current correction value Rd to the torque current command value Cq and the weak field current command value Cd.

Here, the current correction value data are data that represent the torque current correction value Rq and the weak field current correction value Rd, which make the drag torques generated by the motor driving system 2 other than the motor generator 20, that is, the load applied to the engine 1 by the motor driving system 2, zero.

For example, the torque current correction value Rq and the weak field current correction value Rd may be set so that mechanical losses (e.g., load) occurring from the mechanical elements other than the motor generator 20, for example, the mechanical elements such as the belt 21 and the pulley 22, of the motor driving system 2, become zero.

Here, since the loads applied to the engine 1 by the motor driving system 2 other than the motor generator 20 are different for each hybrid vehicle, the torque current correction value Rq and the weak field current correction value Rd may be individually set for each hybrid vehicle.

The described process may be stored in memory within a hybrid vehicle (e.g., in RAM, ROM, disc, or any other suitable memory).

Figure 3:
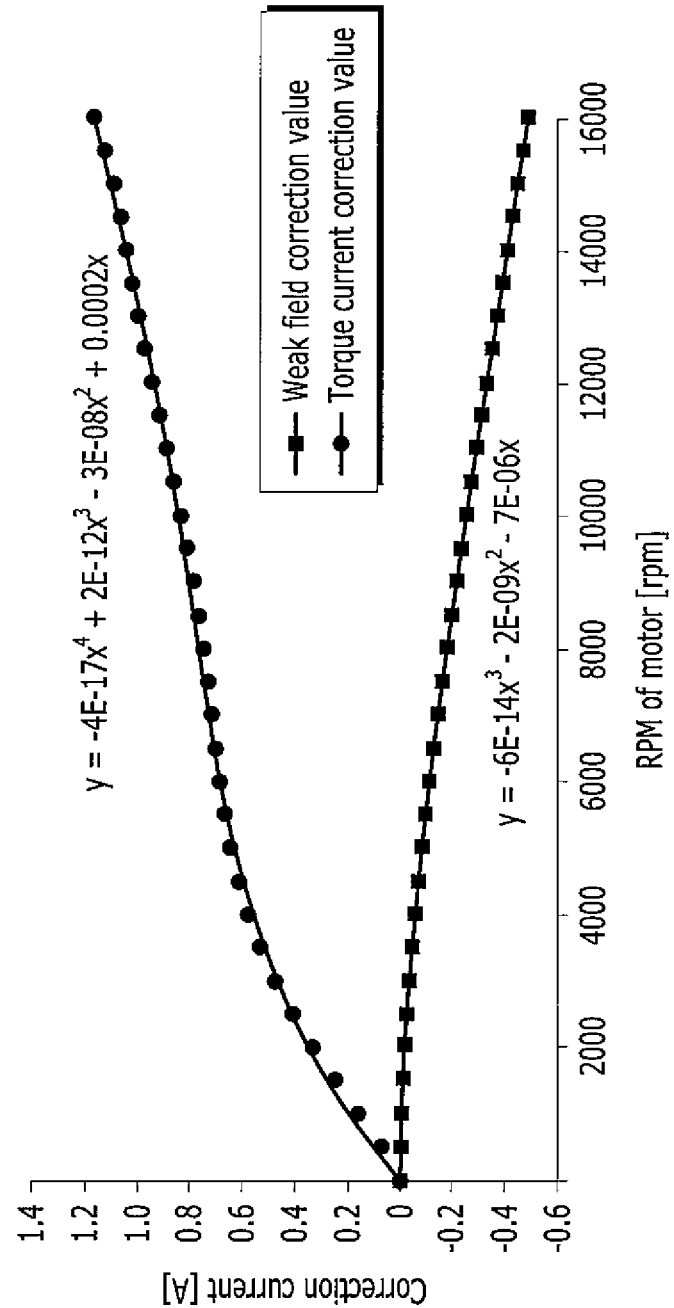
FIG. 3 is a diagram illustrating a relationship between an RPM of a motor generator and a torque current correction value and a weak field current correction value according to an example embodiment of the present invention.

FIG. 3 is a diagram illustrating a relationship between an RPM of a motor generator and a torque current correction value and a weak field current correction value according to an example embodiment of the present invention.

As the example of a method for setting the torque current correction value Rq and the weak field current correction value Rd, as illustrated in FIG. 3, in the state in which the engine 1 and the motor driving system 2 including the motor generator 20 are equipped in the hybrid vehicle, a method for measuring the loads applied to the engine 1 by the motor driving system 2 other than the motor generator 20 for each RPM of the motor generator 20, and setting the torque current correction value Rq and the weak field current correction value Rd depending on the load, may be applied.

Here, the torque current correction value Rq and the weak field current correction value Rd which are measured may be stored as data of a table type which represent the relationship between the RPM of the motor generator 20 and each correction value, or may be stored as formula data (e.g., approximate formula data) based on a polynomial.

The so configured control device 100 for a hybrid vehicle calculates the torque current command value Cq and the weak field current command value Cd, which make the load applied to the engine 1 by the motor generator 20 zero, using the current command value arithmetic unit 101, based on the RPM of the motor generator 20 and the inverter input DC voltage value.

Further, the current command value correction unit 102 calculates the torque current correction value Rq and the weak field current correction value Rd, which make the loads applied to the engine 1 by the motor driving system 2 other than the motor generator 20 zero. Further, since the torque current correction value Rq and the weak field current correction value Rd are each added to the torque current command value Cq and the weak field current command value Cd, the drag torques of each of the motor generator 20 and the motor driving system 2 become 0, and thus the load is not applied to the engine 1.

Further, since the torque current correction value Rq and the weak field current correction value Rd are each added to the torque current command value Cq and the weak field current command value Cd, the motor generator 20 may be driven with an optimal current value and the reduction in efficiency of the motor generator 20 may be suppressed as small as possible.

Further, the current command value arithmetic unit 101 calculates the torque current command value Cq and weak field current command value Cd based on the previously measured correction data for command value calculation, which represent the torque current command value Cq and the weak field current command value Cd which make the load applied to the engine 1 by the motor generator 20 zero, such that the load applied to the engine by the motor generator 20 may be zero (e.g., precisely zero) and the control contents may be simplified.

Similarly, the current command value correction unit 102 calculates the torque current correction value Rq and weak field current correction value Rd based on the previously measured current correction value data, which represent the torque current correction value Rq and the weak field current correction value Rd which make the load applied to the engine 1 by the motor driving system 2 zero, such that the load applied to the engine 1 by the motor driving system 2 may be zero (e.g., precisely zero) and the control contents may be simplified.

Further, when the accumulation of electricity of the electricity storage device 4 is in the full-charge state, the current command value arithmetic unit 101 calculates the torque current command value Cq and the weak field current command value Cd so that the loads applied to the engine 1 by the motor generator 20 and the motor driving system 2 become zero and the current command value correction unit 102 calculates the torque current correction value Rq and the weak field current correction value Rd. Therefore, it is possible to reduce (e.g., prevent) the overcharge of the electricity storage device 4 and the deterioration of the electricity storage device 4, while charging the electricity storage device 4 without excess and deficiency.

The present invention is not limited to the above example embodiments. For example, in the case in which the current command value arithmetic unit 101 calculates the torque current command value Cq and the weak field current command value Cd so that the loads applied to the engine 1 by the motor generator 20 and the motor driving system 2 become zero and in the case in which the current command value correction unit 102 calculates the torque current correction value Rq and the weak field current correction value Rd are not limited to the case in which the accumulation of electricity of the electricity storage device 4 is in the full-charge state, but may be extensively applied to even the case in which the motor generator 20 does not supplement the driving force of the engine 1.

Further, the hybrid vehicle to which the control device 100 for a hybrid vehicle is applied includes the driving shaft 11 of the engine 1 and the motor generator 20 and is not limited to the direct coupling type which mechanically couples the engine to the motor driving system configured with the belt 21 or the pulley 22, but may be a type which may mechanically separate the engine 1 from the motor driving system 2 by, for example, installing the clutch, and the like.

Further, the motor power system S2 is not limited to the configuration including the boosting circuit 10, and may have a configuration without the boosting circuit 10. Further, the correction data for command value calculation may be stored in a dedicated storage unit for storing the correction data for command value calculation or may be stored in the current command value arithmetic unit 101.

Similarly, the current correction value data may be stored in the dedicated current correction value data storage unit or may be stored in the current command value correction unit 102.

In addition, the present invention is not limited to the above example embodiments and therefore may be variously changed without departing from the spirit and scope of the present invention.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SOME OF THE SYMBOLS

100: Control device for hybrid vehicle
1: Engine
11: Driving shaft
2: Motor driving system 20: Motor generator
21: Belt
22: Pulley
3: Inverter
4: Electricity storage device
5: Switch
6: Smoothing codenser
7: Auxiliary device
8: DC auxiliary power supply
9: DC/DC converter
10: Boosting circuit
101: Current command value arithmetic unit
102: Current command value correction unit

What is claimed is:

1. A control device for a hybrid vehicle comprising an engine, a motor generator, an inverter configured to drive the motor generator, and an electricity storage device configured to charge and to discharge power to and from the motor generator through the inverter, to switch to a hybrid driving mode which controls driving using a driving force of the engine and the motor generator and to switch to an engine driving mode which controls driving using only the driving force of the engine, the control device for a hybrid vehicle comprising:
    a current command value calculator configured to calculate a torque current command value and a weak field current command value input to the inverter based on a torque command value representing a torque to be output by the motor generator, a revolutions per minute (RPM) of the motor generator, and an inverter input DC voltage value input to the inverter; and
    a current command value correction calculator configured to calculate a torque current correction value and a weak field current correction value added to the torque current command value and the weak field current command value, respectively, based on the RPM of the motor generator and the inverter input DC voltage value,
    wherein when an accumulation of electricity of the electricity storage device is equal to or larger than a reference value in the engine driving mode, the current command value calculator is configured to calculate the torque current command value and the weak field current command value to make a load applied to the engine by the motor generator zero, and the current command value correction calculator is configured to calculate the torque current correction value and the weak field current correction value to make a load applied to the engine by the motor driving system other than the motor generator zero.

2. The control device of claim 1, further comprising:
    a current correction value data storage unit configured to store current correction value data representing a torque current correction value and a weak field current correction value previously measured for each RPM of the motor generator to make the load applied to the engine by the motor driving system other than the motor generator zero,
    wherein the current command value correction calculator is configured to calculate the torque current correction value and the weak field current correction value using the current correction value data stored in the current correction value data storage unit based on the RPM of the motor generator.

3. The control device of claim 2, wherein the current command value correction calculator is configured to calculate the torque current correction value and the weak field current correction value when the accumulation of the electricity of the electricity storage device is at a full-charge state.

4. The control device of claim 1, wherein the current command value correction calculator is configured to calculate the torque current correction value and the weak field current correction value when the accumulation of the electricity of the electricity storage device is at a full-charge state.

5. A control program for a hybrid vehicle comprising an engine, a motor generator, and an inverter configured to drive the motor generator, and an electricity storage device configured to charge and to discharge power to and from the motor generator through the inverter, switch to a hybrid driving mode which controls driving using a driving force of the engine and the motor generator and to switch to an engine driving mode which controls driving using only the driving force of the engine, the control program for the hybrid vehicle allowing a computer to execute functions of:
    a current command value calculator configured to calculate a torque current command value and a weak field current command value input to the inverter based on a torque command value representing a torque to be output by the motor generator, a revolutions per minute (RPM) of the motor generator, and an inverter input DC voltage value input to the inverter; and
    a current command value correction calculator configured to calculate a torque current correction value and a weak field current correction value added to the torque current command value and the weak field current command value, respectively, based on the RPM of the motor generator and the inverter input DC voltage value,
    wherein when an accumulation of electricity of the electricity storage device is equal to or larger than a reference value in the engine driving mode, the current command value calculator is configured to calculate the torque current command value and the weak field current command value to make a load applied to the engine by the motor generator zero, and the current command value correction calculator is configured to calculate the torque current correction value and the weak field current correction value to make a load applied to the engine by the motor driving system other than the motor generator zero.

* * * * *